United States Patent Office 2,946,775
Patented July 26, 1960

2,946,775
IMPROVING THE COLOR OF PETROLEUM RESINS

Arthur Douwe de Vries and Fred J. Buchmann, Baton Rouge, La., assignors to Esso Research and Engineering Company, a corporation of Delaware No Drawing. Filed Apr. 17, 1956, Ser. No. 578,591

2 Claims. (Cl. 260—82)

This invention relates to the preparation of resins from steam-cracked petroleum streams and more particularly relates to a method for improving the color of such resins.

It is known that resins can be prepared by the Friedel-Crafts polymerization of steam-cracked petroleum streams. Resins produced in this manner are normally dark yellow to red in color. It has previously been proposed to limit the feed to the polymerization to those fractions boiling below 85° C. in order to remove the heavier diolefins and the least active $C_7$ olefins prior to polymerization. These compounds contribute greatly to the color of the resin and when removed from the feed, the product is considerably reduced. However, the use of such a feed means that a substantial portion of the feed which would normally be used for resin formation is lost since the feeds available in the refinery boil up to about 150–175° C.

It has now been found that a much wider boiling feed can be used and lighter colored resins can be produced by providing a substantially dry feed and lowering the catalyst concentration during the polymerization step.

It is usually very difficult to keep hydrocarbon feed streams completely dry in a refinery. In many cases they are stored over water and even if they are not they easily pick up moisture from the atmosphere. For most purposes the presence of a small amount of water in these hydrocarbon streams does not affect the uses to which they are to be put, hence no great care is taken to avoid their contact with water. In accordance with this invention, however, it has been found that by the reduction of the water content to 130 p.p.m. or below while simultaneously reducing the catalyst concentration to below 0.5% based on feed, the color of the resin can be greatly improved.

Thus, the invention is of especial importance as a valuable process for the production of light-colored, unsaturated resins from the highly unsaturated petroleum fractions produced by steam cracking. Preferably, the cyclic diolefins, such as cyclopentadiene and methylcyclopentadiene, are removed from a steam-cracked fraction boiling substantially below $C_9$. At least 50% up to all of the isoprene-containing fraction present and boiling from the initial boiling point up to 38° C. is also removed. The cyclic diolefins, including cyclopentadiene and methyl cyclopentadiene, are preferably removed by dimerization and distillation. The isoprene fraction is either completely removed or othe isoprene content is adjusted by fractional distillation and/or suitable blending of streams. The resulting stream is a fraction boiling below $C_8$ or $C_9$, and is polymerized at temperatures below 70° C. with an aluminum halide catalyst as the solid, as a slurry or in solution. Conversions of 25% to 50% of the prepared feed to resins are obtained.

These resins are light colored and have high softening points. They are of particular use in paper coating and printing ink formulations, as rubber compounding ingredients, and for blending with high softening point resins in the preparation of floor tile.

In accordance with the invention, therefore, petroleum fractions such as kerosene, gas oil, naphtha, etc. are cracked in the presence of steam at temperatures above 550° C. up to 800° C. to give unsaturated product streams. The liquid cut boiling mostly below about $C_9$ but containing components up to $C_{14}$ is segregated and heated at about 105 to 120° C. to dimerize cyclopentadienes. Thereafter, a $C_8$ to $C_9$ and lighter liquid cut is taken overhead to separate dimer concentrates as bottoms. The overhead stream, substantially freed of cyclodienes, is then fractionated to remove at least half, preferably all, of the isoprene-containing fraction boiling below 38° C. The feeds thus obtained boil predominantly between 38° C. and 150–175° C. but may contain constituents boiling as low as 20° C. Analyses of typical feeds are given below:

| Composition, Wt. Percent | Boiling Range | |
|---|---|---|
| | 38–150° C. | 20–170° C. |
| Olefins | 51–62 | 68–30 |
| Diolefins | 10–15 | 8–20 |
| Paraffins and Naphthenes | 3–4 | 5–1 |
| Aromatics | 25–30 | 19–49 |

In accordance with the invention, the feeds are treated with alumina or other drying agents to reduce the water content to at least 130 p.p.m. or less. Feed dried in this manner is then contacted with less than 0.5%, preferably 0.2 to 0.4% of an aluminum halide catalyst at −40 to +70° C., preferably 30 to 50° C. under conditions of good agitation. The resin thus formed is recovered by water and/or alkali washing to remove catalyst, followed by stripping off the unpolymerized material. The resulting crude resin is then stripped under vacuum or with steam to remove liquid polymer and to recover a solid resin product having a softening point of 85° C. or higher.

The following examples are given to illustrate but not to limit this invention.

Example I

A series of comparative runs were carried out using a feed stock boiling from about 45° C. to 150° C. from which essentially all of the isoprene and the cyclodienes had been removed. The catalyst concentration and water content of the feed were varied and the effect on the color of the product was determined. The following data were obtained:

| Run No. | $AlCl_3$ Catalyst Conc., Percent on Feed | $H_2O$ in Feed, p.p.m. | Resin Inspection | |
|---|---|---|---|---|
| | | | Softening Point ° C. | Color (Gardner) |
| 1 | 1.18 | 268 | 93.8 | 8.5 |
| 2 | 1.25 | 257 | 93.5 | 8.5 |
| 3 | 1.23 | 310 | 97.0 | 8.5 |
| 4 | 1.08 | 336 | 97.0 | 8.5 |
| 5 | 1.15 | 300 | 94.0 | 8 |
| 6 | 1.20 | 283 | 92.5 | 8.5 |
| 7 | 1.20 | 303 | 92.0 | 8.5 |
| 8 | 1.03 | 268 | 94.0 | 9 |
| 9 | 0.80 | 289 | 94.3 | 9 |
| 10 | 0.63 | 289 | 99.0 | 9 |
| 11 | 0.73 | 16 | 88.0 | 7 |
| 12 | 0.58 | 10 | 96.5 | 7.5 |
| 13 | 0.38 | 52 | 95.0 | 6 |
| 14 | 1.00 | 48 | 92.0 | 7 |
| 15 | 0.44 | 126 | 96.5 | 6.5 |
| 16 | 0.40 | 22 | 99.0 | 6.0 |
| 17 | 0.40 | 22 | 100.5 | 6.0 |

The above data show that catalyst concentration alone has no effect on the color of the resin (note runs 9 and 10), while reduction of water content of feed at constant catalyst concentration will give a somewhat lower color (note run 8 vs. run 14 and run 15 vs. run 16). However, when the catalyst concentration is lowered below 0.5 and the water content below 130 p.p.m., the color is reduced to a minimum (note run 8 vs. runs 11, 12, 13, 15 and 16).

The nature of the present invention having thus fully set forth and specific examples of the same given, what is claimed as new and useful and desired to be secured by Letters Patent is:

1. A process for preparing resins of improved color which comprises isolating a steam-cracked petroleum fraction boiling between about 20 and 175° C., heating the steam-cracked fraction to a temperature sufficient to dimerize substantially all of the cyclodienes in said fraction, stripping the resulting mixture to separate an overhead product from the dimerized cyclodienes, fractionating the overhead product to separate at least 50% of the product boiling up to 38° C., including isoprene, recovering a product stream boiling between about 20 and 170° C. and having the following composition:

| Composition: | Weight percent |
|---|---|
| Olefins | 68–30 |
| Diolefins | 8–20 |
| Paraffins and naphthenes | 5– 1 |
| Aromatics | 19–49 | drying said product stream to reduce its water content to less than 130 p.p.m., polymerizing said dried product stream by contacting it with 0.2 to 0.4 wt. percent aluminum chloride catalyst at a temperature between —40 and 70° C., and recovering a light colored resin.

2. A process for preparing resins of improved color which comprises isolating a steam-cracked petroleum fraction boiling between about 38 and 150° C., heating the steam-cracked fraction to a temperature sufficient to dimerize substantially all of the cyclodienes in said fraction, stripping the resulting mixture to separate an overhead product from the dimerized cyclodienes, fractionating the overhead product to separate at least 50% of the product boiling up to 38° C., including isoprene, recovering a product stream boiling between about 38 and 150° C. and having the following composition:

| Composition: | Weight percent |
|---|---|
| Olefins | 51–62 |
| Diolefins | 10–15 |
| Paraffins and naphthenes | 3– 4 |
| Aromatics | 25–30 | drying said product stream to reduce its water content to not less than 50 p.p.m., polymerizing said dried product stream by contacting it with 0.2 to 0.4 weight percent aluminum chloride catalyst at a temperature between —40 and 70° C., and recovering a light colored resin.

References Cited in the file of this patent

UNITED STATES PATENTS

| | | |
|---|---|---|
| 1,982,707 | Thomas | Dec. 4, 1934 |
| 1,982,708 | Thomas et al. | Dec. 4, 1934 |
| 2,193,792 | Wilson | Mar. 19, 1940 |
| 2,734,046 | Nelson et al. | Feb. 7, 1956 |
| 2,836,581 | Gordon | May 27, 1958 |